(12) United States Patent
Haikin (10) Patent No.: US 7,483,170 B2
(45) Date of Patent: Jan. 27, 2009

(54) GENERATION OF COLOR MEASURED DATA FROM TRANSFORM-BASED COLOR PROFILES

(75) Inventor: John Haikin, Fremont, CA (US)

(73) Assignee: Canon Kabushiki Kaisha, Tokyo (JP)

(*) Notice: Subject to any disclaimer, the term of this patent is extended or adjusted under 35 U.S.C. 154(b) by 268 days.

(21) Appl. No.: 10/840,554

(22) Filed: May 5, 2004

(65) Prior Publication Data

US 2005/0249403 A1 Nov. 10, 2005

(51) Int. Cl.
*G06F 15/00* (2006.01)

(52) U.S. Cl. .................. 358/1.9; 358/1.15; 358/2.1; 358/523; 358/538; 358/530; 345/153; 345/593; 345/594; 382/162; 382/167

(58) Field of Classification Search ............. 358/1.9, 358/1.15, 2.1, 523, 538, 530; 345/593, 594, 345/153; 382/162, 167
See application file for complete search history.

(56) References Cited

U.S. PATENT DOCUMENTS

| 6,088,038 | A | 7/2000 | Edge et al. ............ 345/431 |
| 6,108,442 | A | 8/2000 | Edge et al. ............ 382/167 |
| 6,337,922 | B2 | 1/2002 | Kumada ............... 382/162 |
| 6,362,808 | B1 * | 3/2002 | Edge et al. ............ 345/601 |
| 6,373,531 | B1 * | 4/2002 | Hidaka et al. .......... 348/603 |
| 6,459,436 | B1 | 10/2002 | Kumada et al. ........ 345/590 |
| 6,498,610 | B1 | 12/2002 | Glaspy, Jr. ............ 345/603 |
| 6,603,483 | B1 * | 8/2003 | Newman ............... 345/593 |
| 6,650,771 | B1 * | 11/2003 | Walker ................. 382/162 |
| 6,870,636 | B2 * | 3/2005 | Kulkarni .............. 358/1.9 |
| 6,967,746 | B1 * | 11/2005 | Walker et al. .......... 358/1.9 |
| 7,106,474 | B1 | 9/2006 | Haikin et al. .......... 358/1.9 |
| 7,251,058 | B2 * | 7/2007 | Pop .................... 358/1.9 |
| 2003/0053094 | A1 * | 3/2003 | Ohga et al. ............ 358/1.9 |
| 2003/0053682 | A1 * | 3/2003 | Haikin et al. .......... 382/162 |
| 2003/0142110 | A1 * | 7/2003 | Murashita ............. 345/600 |
| 2004/0141192 | A1 * | 7/2004 | Jodra et al. ........... 358/1.9 |
| 2005/0099427 | A1 | 5/2005 | Stokes ................. 345/589 |
| 2005/0105106 | A1 | 5/2005 | Haikin ................. 358/1.9 |

* cited by examiner

*Primary Examiner*—Edward L Coles
*Assistant Examiner*—Michael Burleson
(74) *Attorney, Agent, or Firm*—Fitzpatrick, Cella, Harper & Scinto (57) ABSTRACT

Color measurements are generated from transform-based device profiles for use in a measurement-based color management system. The color measurements is generated by providing device-dependent color samples to a transform-based color management module and converting them to the profile connection space with the device's transform-based profile. Color measurements are then generated from the transform-based color management module by applying an identity profile in place of a destination device profile. In addition, measurement data can be extracted directly from either the tone reproduction curve/matrix or n-dimensional lookup table transforms contained within a transform-based device profile.

33 Claims, 6 Drawing Sheets

GENERATION OF COLOR MEASURED DATA FROM TRANSFORM-BASED COLOR PROFILES

BACKGROUND OF THE INVENTION

1. Field of the Invention

The present invention relates to a color management system for generating color measurements from transform-based color profiles for use in a measurement-based color management system.

2. Description of the Related Art

Typically, color management systems utilize standardized transform-based color profiles for the conversion of color image data between device-dependent and device-independent color spaces. Such transform-based color profiles are often created by a hardware manufacturer of a given color device, such as a printer or a digital camera. Typically, transform-based color profiles are designed to meet the specifications set forth by the International Color Consortium (ICC). The current specification is entitled Specification ICC. 1:2003-09, File Format for Color Profiles [Version 4.1.0], Sep. 24, 2003, and may be found at http://www.color.org/icc_specs2.html. The contents of the current specification are incorporated herein by reference.

A color transform contained in a transform-based color profile can be in the form of an n-dimensional lookup-table (LUT) or a set of tone reproduction curves (TRC) and a matrix. For instance, in the case of a CRT monitor, a set of tone reproduction curves and a matrix can be used by a CMM to convert RGB values used by the device to device-independent color space values. The device-independent color space values can then be converted to a device-dependent color space utilizing the same CMM in combination with another device's transform-based color profile.

More recently, measurement-based CMMs have been developed that use device profiles which include actual measurements of the device's color characteristics, such as XYZ measurements of color patch data from an IT8.7/2 target. Measurement-based CMMs are sometimes called "smart" CMMs for their ability to use the actual measurements to obtain increasingly refined color characteristics of the profiled device.

Unlike a typical transform-based CMM, however, measurement-based "smart" CMMs cannot directly utilize the color transforms contained within transform-based color profiles. This is because "smart" CMMs directly utilize color measurement data profiles corresponding to a color device to generate a color transform for converting image data from a device-dependent color space to a device-independent color space.

Given the widespread use of transform-based color profiles for color devices, such as ICC color profiles, it is desirable to have a method for utilizing these transform-based color profiles in combination with a measurement-based "smart" CMM.

SUMMARY OF THE INVENTION

The present invention addresses the foregoing problems by providing a color management system in which color measurements are generated mathematically from transform-based color profiles for use in measurement-based color management systems.

According to one aspect of the invention, color measurements are generated for use in a measurement-based color management system by accessing a transform-based color profile which contains a color transform for transforming color data from a device-dependent color space to a colorimetric device-independent color space. Color measurements are generated using the color transform of the color profile. A color appearance-based transform is created using the generated color measurements, wherein the color appearance based transform is consistent with a color appearance model used by the measurement-based color management system for transforming color image data to an internal color appearance space.

According to one aspect of the invention, device-dependent color samples are supplied to a transform-based color management module. The device-dependent color samples represent color values at which a device would be measured to create a measurement data profile. The supplied device-dependent color samples are converted to a colorimetric device-independent color space with the color management module by utilizing the color transform contained within the transform-based color profile. The converted device-dependent color samples are then scaled with an identity profile in order to generate color measurements.

In this way, the invention provides a convenient method for generating color measurements by utilizing pre-existing transform-based color profiles for use in "smart" color management modules. Also, increased accuracy is achieved by scaling the generated color measurements.

According to another aspect of the invention, in the case that the transform-based color profile was created using measurements that were measured under viewing conditions other than a D50 white point, the invention scales the generated color measurements with a chromatic adaptation transform contained within the transform-based color profile. In this way, the invention can accurately produce generated color measurements for devices with different white points.

According to yet another aspect of the invention, when the color transform of the color profile is an n-dimensional lookup table, measured data points are extracted from the n-dimensional lookup table. Similarly, when color transform of the color profile is a set of tone reproduction curves and matrix, measured data points are extracted from the set tone reproduction curves and matrix.

In this way, the invention is able to reduce operating time and increase efficiency by extracting measured data directly from the transform-based profiles for use in a "smart" measurement-based color management module.

This brief summary has been provided so that the nature of the invention may be understood quickly. A more complete understanding of the invention can be obtained by reference to the following detailed description of the preferred embodiment thereof in connection with the attached drawings.

DETAILED DESCRIPTION OF THE INVENTION

The present invention provides a color management method for mathematically generating color measurements from color transforms in transform-based color profiles. The generated color measurements are used as a color measurement data profile in a measurement-based color management system.

Typically, the present invention is implemented in a computing environment. A representative computing system may include computing equipment, peripherals and digital devices which may be used in connection with practicing the present invention. The computing equipment includes a host processor which comprises a personal computer (hereinafter "PC"), preferably an IBM PC-compatible computer having a windowing environment such as Microsoft Windows 98, Windows 2000, Windows Me, Windows XP, or Windows NT, or other windowing systems such as LINUX. In the alternative, the host processor may be an Apple computer or other non-windows based computers. The computing equipment also includes a color monitor, including a display screen, a keyboard for entering text data and user commands, and a pointing device. The pointing device preferably comprises a mouse for pointing and for manipulating objects displayed on the display screen.

The computing equipment also includes computer-readable memory media such as a computer fixed disk and a floppy disk drive. A floppy disk drive provides a means whereby the computing equipment can access information, such as image data, computer-executable process steps, application programs, etc. stored on removable memory media. In the alternative, information can also be retrieved through other means such as a USB storage device connected to a USB port, or through a network interface. Also, a CD-ROM drive and/or a DVD drive may be included so that the computing equipment can access information stored on removable CD-ROM and DVD media.

Various peripheral devices are generally used in the computing system. For example, color bubble jet printers and color laser printers, which form color images on a recording medium such as paper or transparencies or the like are typically employed. Preferably, the printers form color images using cyan, magenta, yellow and black inks, although the present invention can be used with printers and devices which use other colorant combinations. The invention is also usable with other printers that use such colorant combinations, so long as the printer is capable of being interfaced to computing equipment. In addition, other peripherals including digital color scanners, digital color cameras, and digital video cameras may be employed.

The internal architecture of the host processor of the computing equipment includes a central processing unit (CPU) which interfaces with a computer bus. Also interfacing with computer bus are a fixed disk, a network interface, a random access memory (RAM) for use as a main run-time transient memory, a read only memory (ROM), a floppy disk interface, a display interface for the monitor, a keyboard interface for the keyboard, a mouse interface for the pointing device, a scanner interface for the scanner, a printer interface for the printers, and a digital camera interface for the digital camera.

The RAM interfaces with the computer bus so as to provide information stored in the RAM to the CPU during execution of software programs such as an operating system, application programs, such as a color management module, and device drivers. More specifically, the CPU first loads computer-executable process steps from the fixed disk, or another storage device, into a region of the RAM. The CPU can then execute the stored process steps from the RAM in order to execute the loaded computer-executable process steps. Data such as color images or other information can be stored in the RAM, so that the data can be accessed by CPU during the execution of computer-executable process steps need to access and/or modify the data.

The fixed disk contains the operating system, and application programs, such as a color management system program. The fixed disk also contains a digital camera driver, a monitor driver, a printer driver, a scanner driver, and other device drivers. The fixed disk also includes image files, other files, transform-based device profiles for implementing the present invention as described further herein, transform-based color management modules, and measurement-based "smart" color management modules. The color management method of the present invention is preferably performed by computer-executable process steps which are stored on the fixed disk execution by the CPU, such as in one of the application programs or in a measurement-based color management module. The process steps for extracting color measured data from transform-based color profiles of the present invention are described in more detail below.

Figure 1:
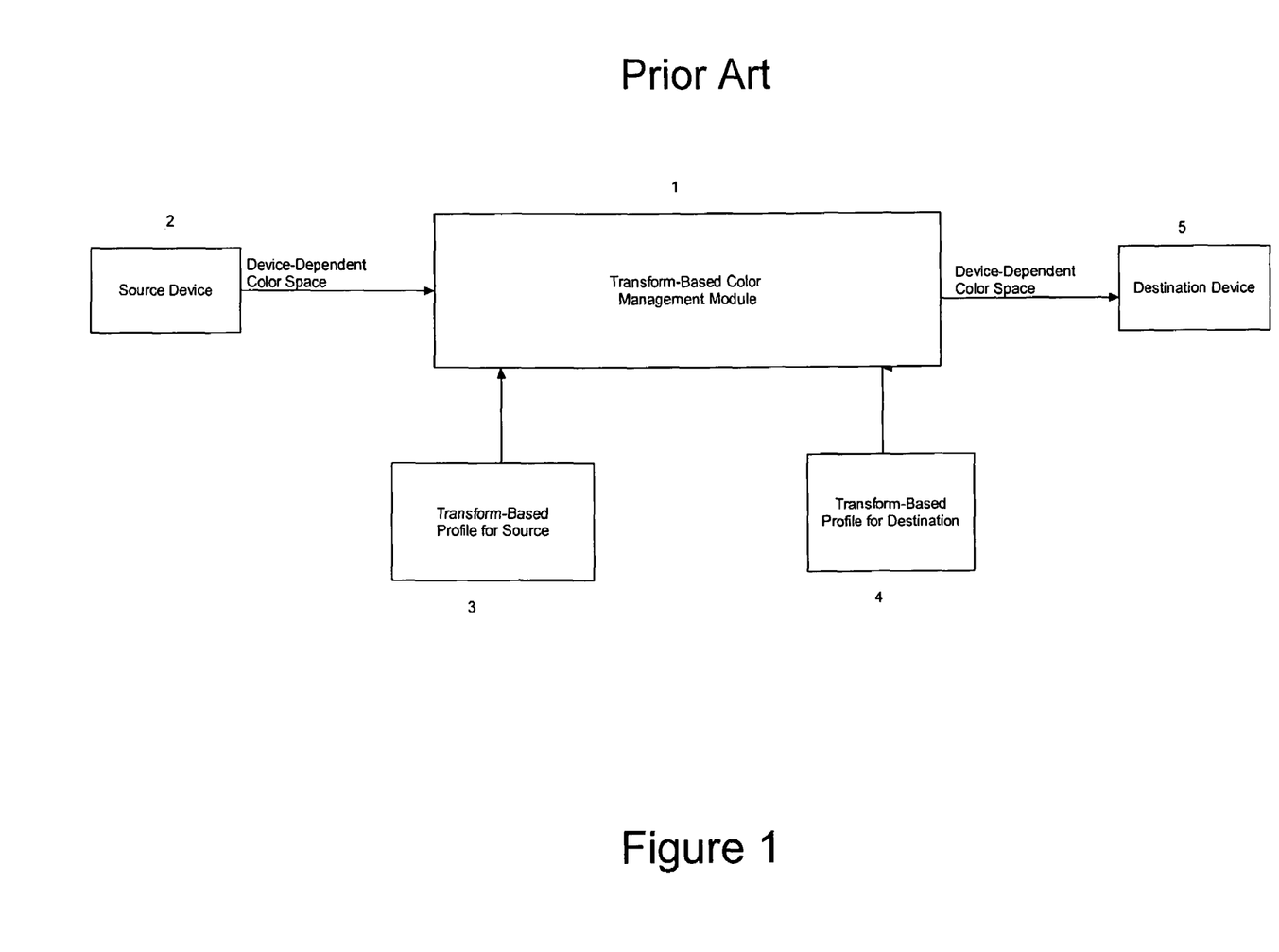
FIG. 1 is a block diagram depicting the operation of an transform-based color management system.

FIG. 1 is a block diagram depicting the arrangement of a typical transform-based color management system. Color data from source device 2 is converted from a device-dependent color space (e.g. RGB) to a device-independent color space by color management module (CMM) 1. CMM 1 utilizes a color transform found in transform-based source profile 3. Such source profiles are also often called color profiles or device profiles. In transform-based color management systems, the color transforms in a transform-based profile transforms device-dependent color values into device-independent values defined by either Commission Internationale de l'Enclairage (CIE) XYZ under a D50 illuminant at an illumination level of 500 lux CIELab under a D50 illuminant at an illumination level of 500 lux. The device-independent color space is also known as the profile connection space (PCS). Once the source device's color values have been converted to PCS, CMM 1 can then utilize a destination profile to transform the color values from PCS to a different device-dependent color space.

Figure 2:
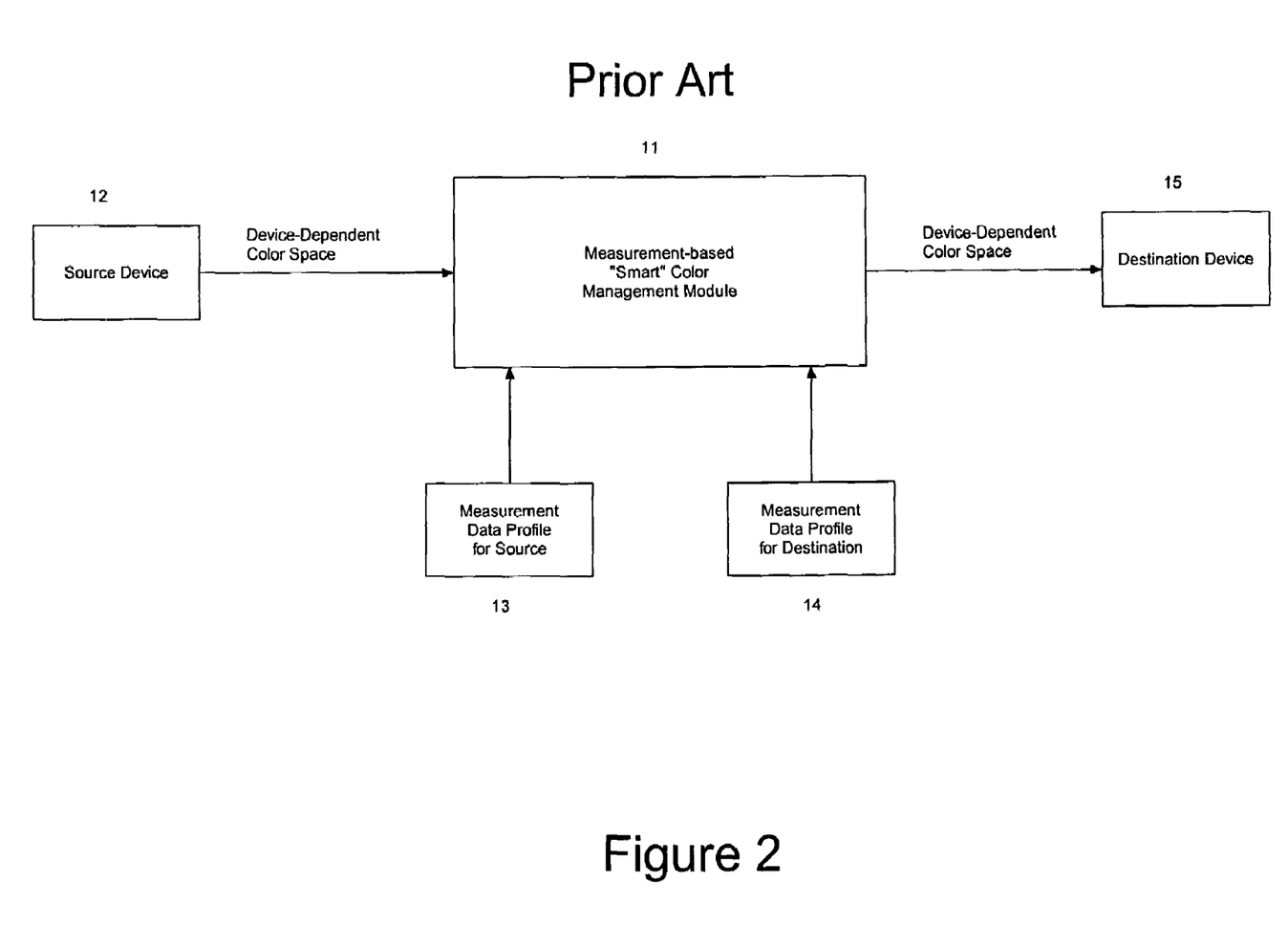
FIG. 2 is a block diagram depicting the operation of a measurement-based "smart" color management system.

FIG. 2 depicts the arrangement of a measurement-based or "smart" color management system. Instead of utilizing color transforms in device profiles to convert from a device-dependent color space to a device-independent space, a "smart" color management system utilizes color measurement data for the source and destination devices. This measurement data is contained in source and destination measurement data profiles 13 and 14. The "smart" CMM constructs a model with the measurement data to map colors from a source device to a device-independent, gamut-less, color appearance space. This model is often called a color appearance-based transfrom. Using a similar technique, the "smart" CMM maps the colors of the device-independent color appearance space to corresponding destination device values. Typically, the measurement data is obtained by measuring the output of a device with a colorimeter, spectrophotometer, or spectroradiometer. The measurement data used by a "smart" color management system is in a scaled CIEXYZ format.

Given the widespread use of transform-based device profiles, it would be convenient to use transform-based device profiles in "smart" measurement based color management systems. However, scaled CIEXYZ measurement data is not explicitly contained in transform-based device profiles, and therefore, transform-based device profiles cannot be directly used by "smart" color management systems.

First Embodiment

Figure 3:
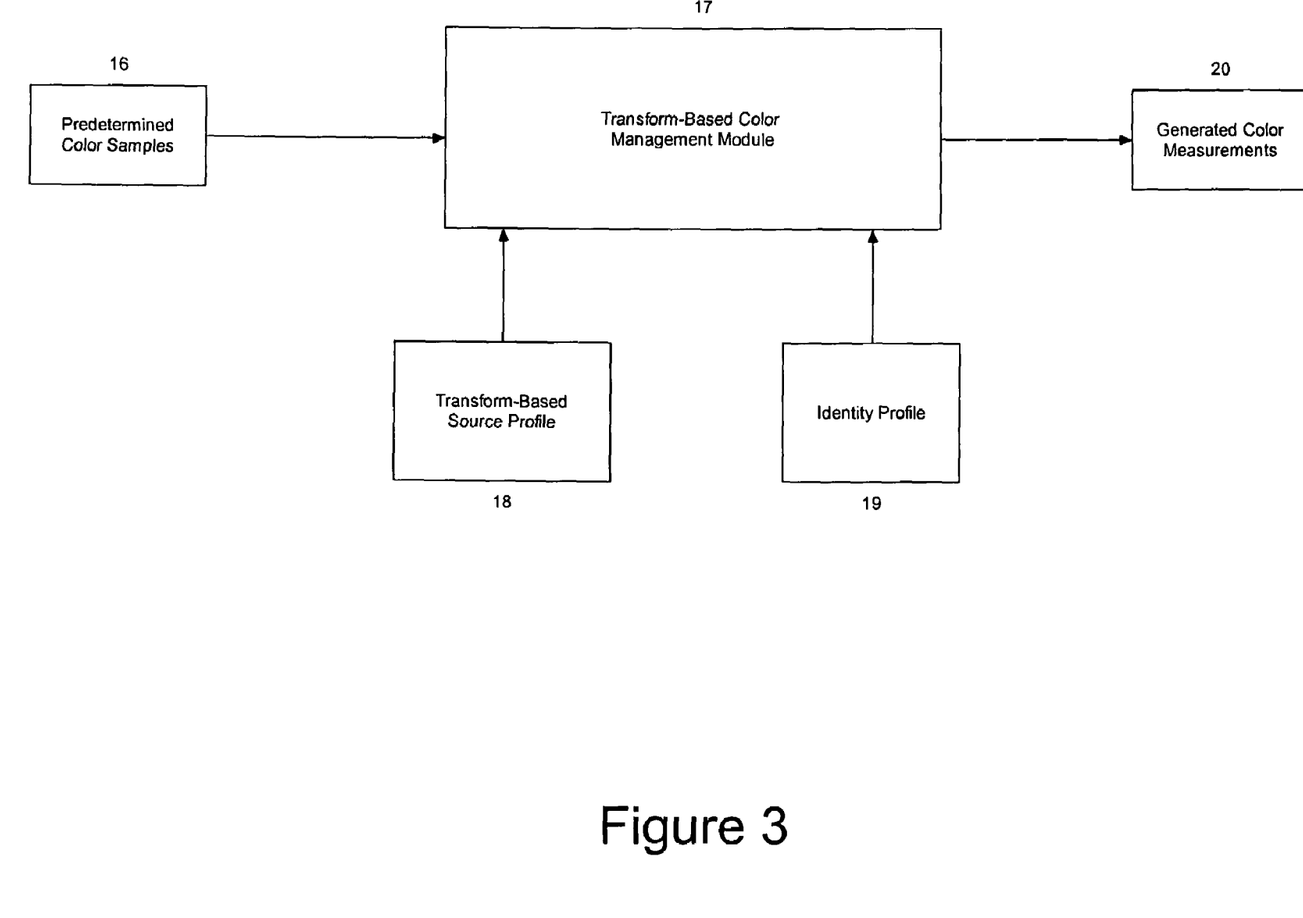
FIG. 3 is a block diagram depicting a method for generating color measurements from an transform-based device profile.

FIG. 3 depicts the first embodiment for generating CIEXYZ measurement data with a transform-based device profile. In this embodiment, a transform-based CMM is used to generate measurement data. Initially, predetermined device-dependent color samples 16 are supplied to transform-based CMM 17. In the case of an RGB scanner, for example, these color samples represent the RGB values at which corresponding CIEXYZ measurements are desired to be obtained. CMM 17 then accesses transform-based source profile 18, which corresponds to the source device for which color measured data is desired.

CMM 17 next converts the supplied device-dependent color samples into a colorimetric device-independent color space. This conversion is accomplished by using the color transform associated with the media-relative colorimetric or absolute colorimetric rendering intents contained in source profile 18.

Either of the two colorimetric rendering intents can be used because they are both based on measurement-based colorimetric values that are chromatically adapted to a D50 illuminant. In addition, the transform associated with these rendering intents is able to map device colorants to a gamut-less PCS. Since, the absolute colorimetric rendering intent is defined with measurements taken under a D50 illuminant, it is preferred. For example, both of these colorimetric rendering intents are available in transform-based ICC profiles that are Version 4.0 or higher.

The colorimetric color transform converts device colorants to a gamut-less PCS in either a CIEXYZ or CIELab format. Since the measurement data used by the "smart" color management system needs to be in a scaled XYZ format, it is desirable to convert the device-dependent color samples into a CIEXYZ PCS. Now, the CIEXYZ PCS values can be converted into the XYZ measurement data format used by the "smart" color management system. This conversion is accomplished by utilizing the transform contained in identity profile 19.

The transform in identity profile 19 is arranged to take advantage of the fact that the PCS is already in the CIEXYZ format. In order to convert the CIEXYZ PCS values (which range from 0 to 0xFFFF) into generated measurement data, the identity profile provides the transform-based CMM with an identity mapping that transforms the CIEXYZ PCS values into channels. The first channel corresponds to the X component of CIEXYZ, the second channel to the Y component, and the third channel to the Z component. The identity mapping also scales each channel by the decimal fraction s/65535 (65535 is the decimal equivalent of 0xFFFF). The scaling factor s represents the maximum X, Y, or Z value to be used by the "smart" system. Typically, the X, Y, and Z values used by the "smart" system will range from 0 to 100. In that case, s is chosen to be 100. However, it is possible to have values that are greater than 100. In order to avoid losing data and in order to maintain precision, it is preferable to choose a scaling factor that is larger than 100 (e.g. s=120 or s=150). In this way, any data associated with generated measurement values that exceed the anticipated maximum will not be lost.

Figure 4:
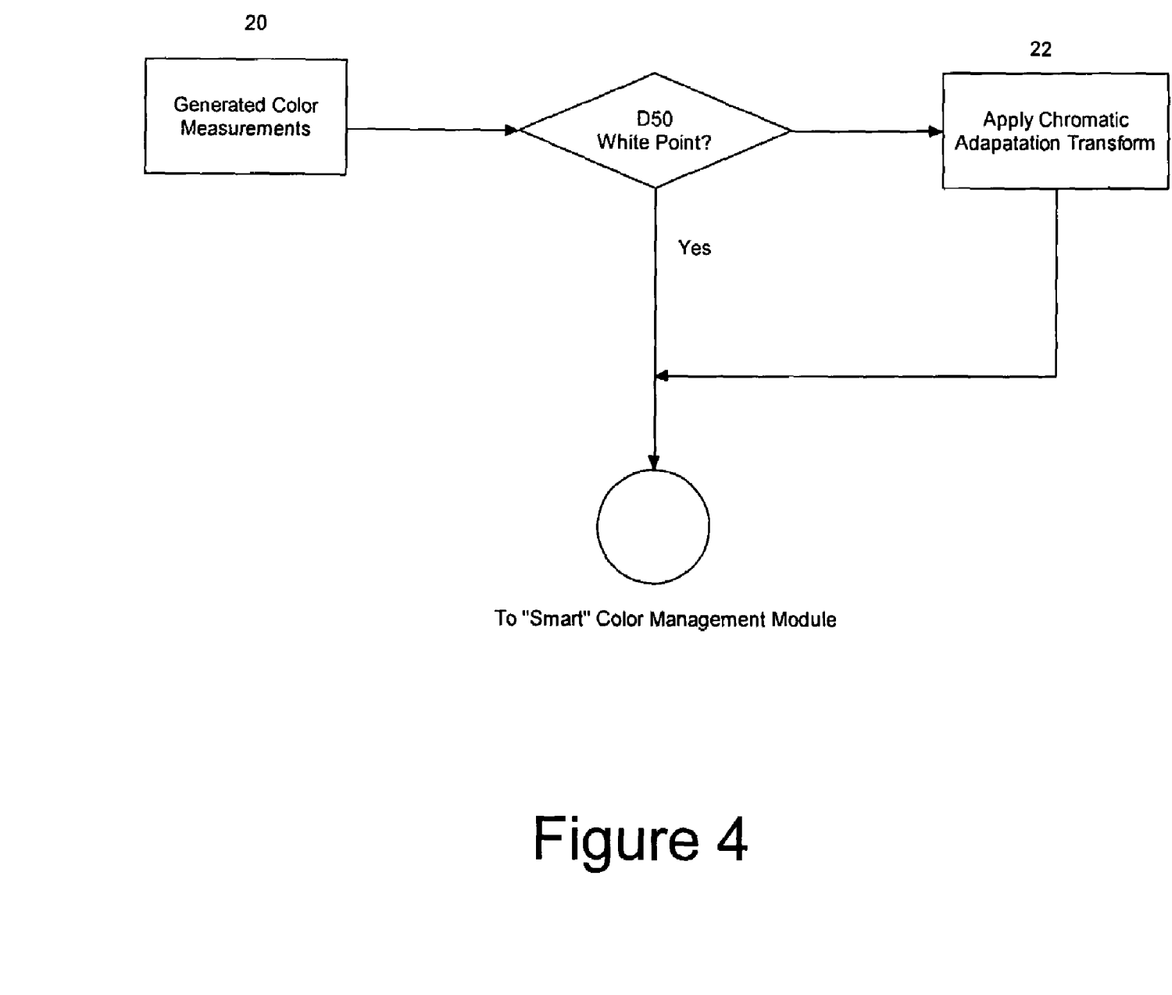
FIG. 4 is a block diagram depicting the method for scaling generated color measurements to a white point other than D50.

The scaled measurement values generated by CMM 17 may require further processing as shown in FIG. 4. Since the colorimetric transforms produce results relative to a D50 illuminant, further processing is required if the color transform associated with the colorimetric rendering intent was created with actual measurements taken under viewing conditions other than D50. If this is the case, the scaled XYZ generated color measurements 20 must also be scaled by applying chromatic adaptation transform (CAT) 22 found in the transform-based profile. After the CAT is applied, the generated XYZ measurement values are relative to the viewing conditions that existed at the time the original measurements were taken.

After any necessary chromatic adaptation transforms have been applied, the generated color measurements are ready to be used as either a source or destination measurement data profile in a "smart" color management system. The "smart" CMM can use the generated color measurements to construct a model, or color appearance-based transform, that maps color values to a device-independent, gamut-less, color appearance space, preferably in the CIECAM97 or CIECAM02 format.

In addition to utilizing an existing transform-based CMM to generate color measurements, a "smart" CMM could be arranged so as to perform the functions of an transform-based CMM internally.

Second Embodiment

In another embodiment of the invention, measurement data is extracted from transform-based device profiles without the use of transform-based CMMs and predetermined device-dependent color samples. Instead, the "smart" CMM reads the profile header and transformation tags in the transform-based device profile.

Figure 5:
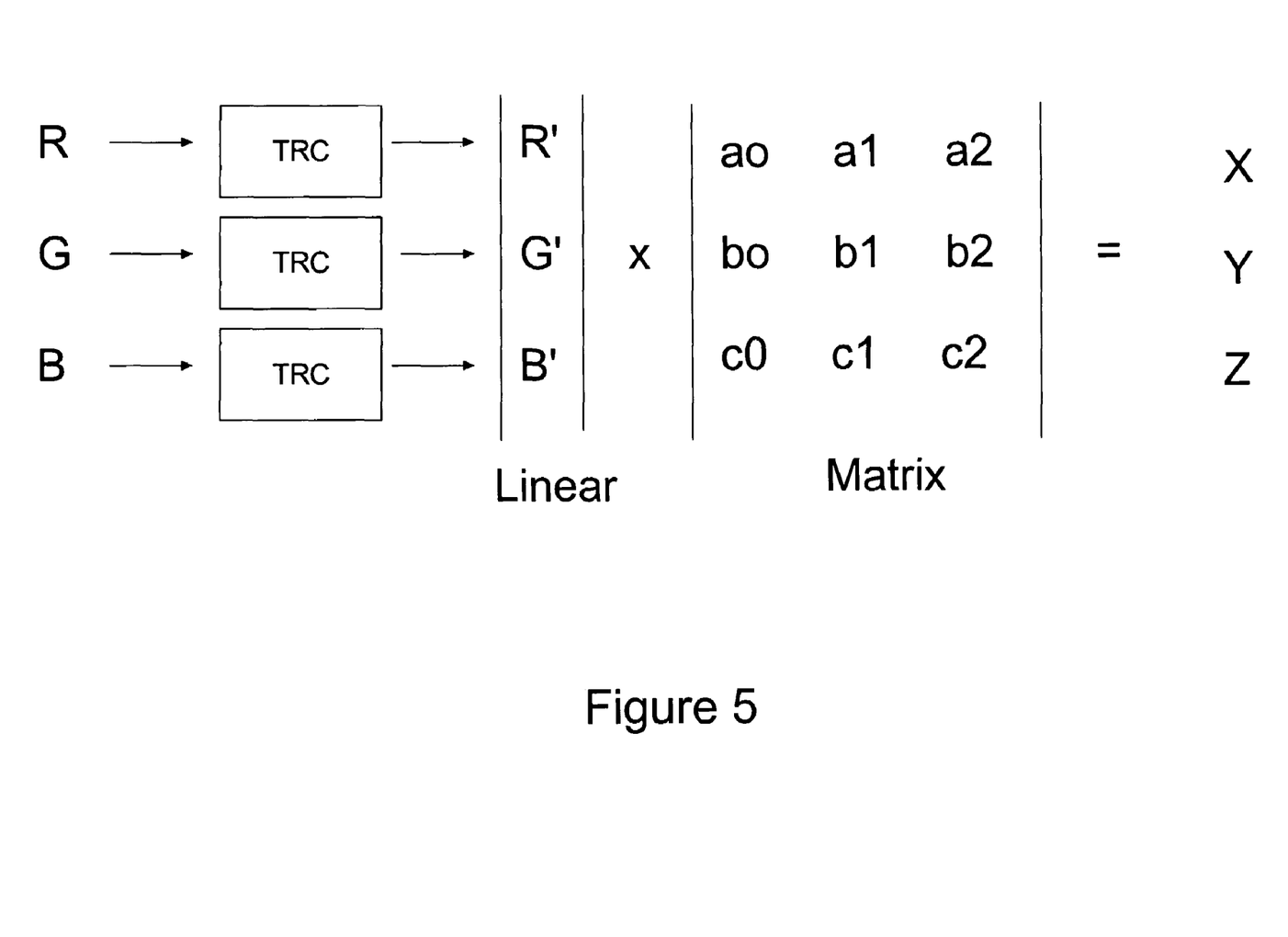
FIG. 5 is a formula for performing a color transform with a set of reproduction curves and a matrix.

Based on the information that is read, the "smart" CMM can determine what type of colorimetric transform is available in the transform-based device profile. For example, the colorimetric color transform for an RGB monitor will often contain a set of tone reproduction curves (TRC) and a matrix. FIG. 5 shows a formula by which a set of tone reproduction curves and matrix transform RGB color data to a CIEXYZ PCS. Rather than using a transform-based CMM to convert device-dependent color samples to CIEXYZ PCS, the "smart" CMM can multiply the set of tone reproduction curves with the matrix to obtain the XYZ measurement values. In addition, the "smart" CMM can apply a chromatic adaptation transform to the extracted XYZ measurement values to scale for a non-D50 white point as described with reference to FIG. 4.

Figure 6:
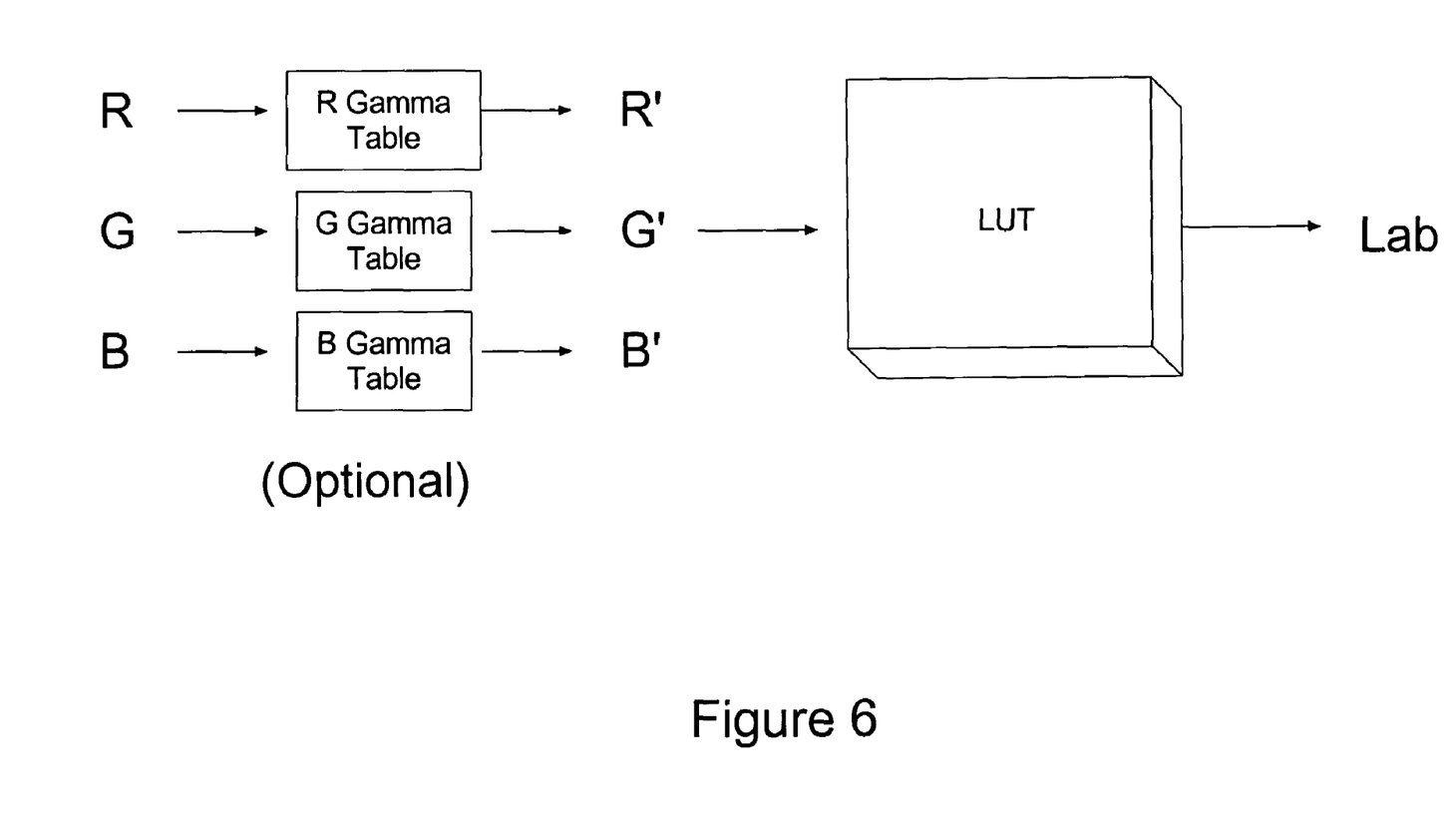
FIG. 6 is a formula for performing a color transform with an n-dimensional lookup table.

XYZ measurement values can also be extracted from a color transform represented as an n-dimensional lookup table. FIG. 6 shows a formula by which a 3-dimensional lookup table transforms RGB device-dependent color values to CIELab PCS. In order to obtain XYZ measurements from the lookup table, linear interpolation sampling of an Lab entry point is performed in order to find the corresponding linear R=G=B=value. If the optional 1-dimensional matrix is used, that matrix is inverted and applied to the linear R=G=B=values to obtain RGB values. The obtained RGB value corresponds to the Lab entry point used for the linear interpolation. In order to obtain an XYZ measurement for the RGB value, the associated Lab entry point is simply converted to CIEXYZ. As with the TRC/matrix transform, the "smart" CMM can apply a chromatic adaptation transform to the extracted XYZ measurement values to scale for a non-D50 white point as described with reference to FIG. 4.

The invention has been described above with respect to particular illustrative embodiments. It is understood that the invention is not limited to the above-described embodiments and that various changes and modifications may be made by those skilled in the relevant art without departing from the spirit and scope of the invention.

What is claimed is:

1. A color management method for constructing a device model for a device, wherein the device model is constructed for use in a measurement-based color management system, the method comprising the steps of:

accessing a transform-based color profile for the device which contains a color transform for transforming color data from a device-dependent color space to a colorimetric device-independent color space, wherein the transform-based color profile is designed for use in a transform-based color management system;

computationally generating color measurements for use in the measurement-based color management system by computationally transforming a plurality of predetermined color samples by using the color transform contained in the transform-based color profile; and constructing the device model for the device by using the computationally generated color measurements, wherein the device model transforms color data from the device-dependent color space to the calorimetric device-independent color space, and wherein the device model is constructed for use in the measurement-based color management system.

2. The color management method according to claim 1, wherein the color transform is a set of tone reproduction curves and matrix and said generating step further includes, extracting color measurements from the set of tone reproduction curves and matrix.

3. The color management method according to claim 2, further comprising the step of creating a color appearance-based transform using the generated color measurements, wherein the color appearance-based transform is consistent with a color appearance model used by the measurement-based color management system for transforming color image data to an internal color appearance space.

4. The color management method according to claim 3, wherein in the case that the transform-based color profile was not created with measurements taken under a D50 specific illuminant, the method further includes the step of:

scaling the extracted color measurements with a chromatic adaptation transform contained within the transform-based color profile.

5. The color management method according to claim 4, wherein the transform-based color profile includes a plurality of rendering intents, including an absolute colorimetric rendering intent and a media-relative colorimetric rendering intent.

6. The color management method according to claim 5, wherein the color transform of the transform-based color profile is defined by the absolute colorimetric rendering intent.

7. The color management method according to claim 5, wherein the color transform of the transform-based color profile is defined by the media-relative colorimetric rendering intent.

8. The color management method according to claim 3, wherein the color appearance-based transform created in the creating step is in a CIECAM97 format.

9. The color management method according to claim 3, wherein the color appearance-based transform created in the creating step is in a CIECAM02 format.

10. The color management method according to claim 1, further comprising the step of:

applying a color appearance-based transform to the color measurements.

11. The color management method according to claim 1, further comprising the step of creating a color appearance-based transform using the generated color measurements, wherein the color appearance-based transform is consistent with a color appearance model used by the measurement-based color management system for transforming color image data to an internal color appearance space.

12. The color management method according to claim 11, further comprising the step of:

supplying device-dependent color samples to a transform-based color management module; and wherein said generating step further includes, converting the supplied device-dependent color samples to a colorimetric device-independent color space with the color management module by utilizing the color transform contained within the transform-based color profile accessed in said accessing step, and scaling the converted device-dependent color samples with an identity profile in order to generate the color measurements.

13. The color management method according to claim 12, wherein in the case that the transform-based color profile was not created with measurements taken under a D50 specific illuminant, said generating step further includes, scaling the generated color measurements with a chromatic adaptation transform contained within the transform-based color profile.

14. The color management method according to claim 13, wherein the transform-based color profile includes a plurality of rendering intents, including an absolute colorimetric rendering intent and a media-relative colorimetric rendering intent.

15. The color management method according to claim 14, wherein the color transform of the transform-based color profile is defined by the absolute colorimetric rendering intent.

16. The color management method according to claim 14, wherein the color transform of the transform-based color profile is defined by the media-relative colorimetric rendering intent.

17. The color management method according to claim 14, wherein the supplied device-dependent color samples are converted into a CIEXYZ color space at a D50 luminance having a power of 500 lux.

18. The color management method according to claim 14, wherein said scaling step scales the converted device-dependent color samples by a decimal fraction of $^{100.0}\%_{65535.0}$.

19. The color management method according to claim 14, wherein said scaling step scales the converted device-dependent color samples by a decimal fraction $^{120.0}\%_{65535.0}$.

20. The color management method according to claim 14, wherein said scaling step scales the converted device-dependent color samples by a decimal fraction $^{150.0}\%_{65535.0}$.

21. The color management method according to claim 14, wherein the color appearance-based transform created in the creating step is in a CIECAM97 format.

22. The color management method according to claim 14, wherein the color appearance-based transform created in the creating step is in a CIECAM02 format.

23. The color management method according to claim 13, wherein the creating step further includes, unscaling the generated color measurements.

24. The color management method according to claim 11, wherein the color transform is an n-dimensional lookup table and wherein said generating step further includes, extracting color measurements from the n-dimensional lookup table.

25. The color management method according to claim 24, wherein the n-dimensional lookup table is a three-dimensional lookup table.

26. The color management method according to claim 25, wherein the color appearance based transform created in the creating step is in a CIECAM97 format.

27. The color management method according to claim 25, wherein the color appearance based transform created in the creating step is in a CIECAM02 format.

28. An apparatus for generating color measurements for use in a measurement-based color management system, the apparatus comprising:
   a program memory for storing process steps executable to perform a method according to any one of claims 1 to 27, or 10 to 3; and
   a processor for executing the process steps stored in said program memory.

29. A computer-readable medium which stores computer-executable process steps, the computer-executable process steps for generating color measurements for use in a measurement-based color management system, said computer-executable process steps comprising process steps executable by a computer to perform a method according to any one of claims 1 to 27, or 10 to 3.

30. The color management method according to claim 24, wherein in the case that the transform-based color profile was not created with measurements taken under a D50 specific illuminant, the method further includes the step of:
   scaling the extracted color measurements with a chromatic adaptation transform contained within the transform-based color profile.

31. The color management method according to claim 30, wherein the transform-based color profile includes a plurality of rendering intents, including an absolute colorimetric rendering intent and a media-relative colorimetric rendering intent.

32. The color management method according to claim 31, wherein the color transform of the transform-based color profile is defined by the absolute colorimetric rendering intent.

33. The color management method according to claim 31, wherein the color transform of the transform-based color profile is defined by the media-relative colorimetric rendering intent.

* * * * *